United States Patent [19]

Smith et al.

[11] Patent Number: 5,271,848
[45] Date of Patent: Dec. 21, 1993

[54] TREATING OF WASTE WATER WITH BAUXITE TO REMOVE PHOSPHATES FROM THE WASTE WATER

[76] Inventors: Rodney W. Smith, Rte. 5 Box 128B, Staunton, Va. 24401; William M. Markham, P.O. Box 685, Verona, Va. 24482; Walter W. Robinson, 702 Sleepy Hollow Rd., Richmond, Va. 23229

[21] Appl. No.: 849,175

[22] Filed: Mar. 10, 1992

Related U.S. Application Data

[63] Continuation of Ser. No. 643,554, Jan. 18, 1991, abandoned.

[51] Int. Cl.$^5$ .............................................. C02F 1/58
[52] U.S. Cl. .................................. 210/702; 210/906; 423/122; 423/315
[58] Field of Search ............... 210/702, 906, 907, 683; 423/122, 308, 315

[56] References Cited

U.S. PATENT DOCUMENTS

| | | | |
|---|---|---|---|
| 3,499,837 | 3/1970 | Jaunarjs | 210/906 |
| 3,595,785 | 7/1971 | Bruce et al. | 210/906 |
| 4,167,479 | 9/1979 | Besik | 210/617 |
| 4,184,947 | 1/1980 | Demisch | 210/617 |
| 4,826,601 | 5/1989 | Spratt et al. | 210/906 |

Primary Examiner—Stanley S. Silverman
Assistant Examiner—Neil McCarthy
Attorney, Agent, or Firm—Sheldon H. Parker

[57] ABSTRACT

Bauxite mineral is used directly, to remove phosphates from water, in a high efficiency, highly economical system. The process of the invention involves the step of contacting the waste water stream with Bauxite for a time sufficient to lower the phosphate concentration to a predetermined lower level. The predetermined lower level is typically less than about 2 mg/l of water, and can be to a concentration of less than 1 mg/l. The Bauxite has an average particle size of greater than about 50 mesh. Advantageously, the particle size is at least about one quarter of an inch.

The Bauxite which is used can be washed and graded to produce Bauxite having a particle size on the order of about one quarter of an inch. The Bauxite can be ground to an average particle size of at least about 50 mesh to produce a material having a higher reaction rate.

In one embodiment the waste water flows downwardly through the bed of Bauxite to produce a treated waste water stream having a phosphate concentration less than about 2 mg/l of waste water. The treated waste water is then collected in a settling tank for a time sufficient for precipitated particles to settle out. In another embodiment, the waste water can be subjected to a horizontal flow or upward flow through a Bauxite bed.

9 Claims, No Drawings

TREATING OF WASTE WATER WITH BAUXITE TO REMOVE PHOSPHATES FROM THE WASTE WATER

This is a continuation of Ser. No. 643,554 filed Jan. 18, 1991, abandoned.

BACKGROUND OF THE INVENTION

Field of the Invention

The invention relates to improvements in treatment of waste water, as for example, sewage effluent to raise the quality of waste water produced in sewage disposal systems, e.g., septic tanks, aerobic treatment or settling pond systems. It pertains particularly to the removal of phosphates by a bed which receives untreated or partially treated sewage from a system operating aerobically or anaerobically for stabilization of the waste.

SUMMARY OF THE INVENTION

The spent Bauxite, commonly known as red mud, has been disclosed as having utility in the removal of phosphates from waste water. The red mud interacts with the phosphates and produces precipates which form a sludge which requires disposal. Thus, the aluminum from the Bauxite is removed for use in producing aluminum and the waste material is used in the removal of phosphates from water. It has now been found, surprisingly, that Bauxite mineral can be used directly, to remove phosphates from water, in a high efficiency, highly economical system.

In accordance with the instant invention, there is provided a process for the treating of a waste water stream containing phosphates. The process comprises the step of contacting the waste water stream with Bauxite for a time sufficient to lower the phosphate concentration to a predetermined lower level. The predetermined lower level is typically less than about 2 mg/l of water, and can be to a concentration of less than 1 mg/l. The Bauxite has an average particle size of greater than about 50 mesh. Advantageously, the particle size is at least about one quarter of an inch.

Bauxite is a naturally occurring mineral having a composition, as follows:

| | |
|---|---|
| $Al_2O_3$ | 30–75% |
| $H_2O$ | 9–31% |
| $FE_2O_3$ | 3–25% |
| $SiO_2$ | 2–9% |
| $TiO_2$ | 1–3% |

The Bauxite which is used can be sized, washed and graded to produce Bauxite having a particle size on the order of about one quarter of an inch. The Bauxite can be ground to an average particle size of at least about 50 mesh to produce a material having a higher reaction rate.

In one embodiment the waste water flows downwardly through the bed of Bauxite to produce a treated waste water stream having a phosphate concentration less than about 2 mg/l of waste water. The treated waste water is then collected in a settling tank for a time sufficient for precipitated particles to settle out. In another embodiment, the waste water can be subjected to a horizontal flow through a Bauxite bed. In a further embodiment, waste water is caused to flow upwardly, under presssure, through the bauxite and to discharge from the top of the unit.

DESCRIPTION OF THE PREFERRED EMBODIMENTS

The capital investment costs of building the system of the present invention is comparable to that of conventional systems, or can be less costly than the conventional systems. However, the operating cost of the system of the present invention is much lower than conventional system, due to the longevity of the activity medium and the extremely low energy cost of the operation. Whereas the horsepower of the required pumps in conventional systems is a significant factor on the cost of operation, little or no pumping is required in the system of the present invention.

By way of example, physical mixing by mechanical means is not required in the present system and, unlike conventional systems, aeration blowers are not required.

The process can be applied to waste water streams of various types and from various sources. The common factor is the need to reduce the phosphate concentration of the waste stream. A product of the current process is aluminum phosphate, which is valuable in the fertilization of acid type of plants.

The phosphorus removal of the present invention normally follows biological treatment of the waste water stream. Chemical pretreatment and ph adjustment is not a requirement in the instant process.

The bed of active material can have a ten to twenty year life span before retreatment or replacement of the active material is required.

It is generally held that no currently known technologies can guarantee reduction of the phosphorous level in waste water to a level of no greater than 2 mg/l, on a consistent basis.

One commonly suggested method of phosphate removal from waste water is the contact of the waste stream with the red mud which is recovered as a waste product of aluminum smelting operations. U.S. Pat. No. 4,184,947, is exemplary of such technology. In accordance with the teachings of this patent, effluent from a sewage treatment system, such as a septic tank, a settling chamber, or a settling pond is distributed in or over a leaching bed and is percolated in the presence of entrained air through a filter bed that includes a layer of soil with chemical additives. By admixing chemical additives in the form of hydrous oxides or calcium, aluminum, iron, etc., to the filter media, significant phosphate removal from the waste is obtained. Potential phosphate removers are disclosed as including red mud, laterite, bauxite and bog iron ore.

The disclosure particularly emphasizes selecting red mud as a desirable phosphate ion extracting agent, having a capacity for almost complete phosphate removal. The sodalite structure of the red mud is disclosed as rendering it suitable for ion exchanging which may account in part for its high phosphate ion extracting potency. The red mud sludge is admixed with soil in varying proportions. Because of its very small particle size, the red mud becomes fixed as a very thin coating on the reactive surface of the soil particles and is strongly resistant to being washed out by passing effluent.

Shiao et al, of the Tokyo University (Japan), Department of Metallurgy and Materials Science, disclose in the *Journal of Water Pollution Control Federation*, Volume 49, No. 2, pages 280-285, results of studies on the use of an activated red mud, wasted from the Bayer process for extraction of alumina from bauxite, for phosphate removal. Solid absorbents, such as fly ash and activated alumina, are disclosed as alternatives to conventional methods of phosphorous removal in waste water treatment. According to the publication, raw red mud was activated with 20% HCL and used in batch adsorption studies. Studies on the effect of contact time on phosphate removal efficiency indicated that more than 50% of the phosphate was removed during the first 10 min after contact and about 72% was removed within 120 min. The transition point between the initial rapid removal and the later phase of slower removal may represent a transitional point in the adsorption mechanism, after which pore diffusion rather than surface layer adsorption controls phosphate removal.

In the *Journal of the Institution of Water Engineers and Scientists.*, Volume 39, No. 2, pages 137-154, April 1985, disclosed producing a ferric aluminum sulfate (FAS) liquor for phosphate removal. The FAS coagulant was produced by mixing sulfuric acid with ferruginous bauxite.

U.S. Pat. No. 4,167,479, disclosed a purification process for the removal of biodegradable suspended and dissolved organic solids, nitrogenous compounds and phosphates from waste waters by simultaneously occurring biological and chemical reactions. It is disclosed that the released metal ions of the minerals react with the phosphate ions to form precipitates. Equivalent disclosed minerals which may be used are Bauxite, Cerussite, Clinoptilolite Corundum, Diaspore, Gibbsite, Halloysite, Hematite, Kyanite, Millerite and mixtures thereof.

By way of contrast, in accordance with the present inventions no flocculant need be used and preferably, the particle size of the active mineral is greater than 50 mesh. Moreover, in contradistinction to the disclosures of the prior art, the various sources of reactive aluminum and iron compounds are not all equal. The results achieved with Bauxite in accordance with the instant process, far surpassed the results obtainable with the prior art materials such as red mud, Gibbsite and the like.

The particle size of the Bauxite has an affect on the operation of the process of the invention. The Bauxite appears to function through an adsorption process, and therefor, the greater the surface area of the active particles, the greater is the reaction rate. Since the ratio of surface area to mass of a particle is inversely related to the size of the particle, it would appear that the use of extremely fine particles is desirable. However, fine particles function as a mechanical filter and removes suspended particles from the water. Thus, the rate of clogging of the Bauxite bed, and consequently, the life of the bed, is inversely related to the particle size. The use of particles having a size on the order of about one quarter inch and greater, provides a desired reaction rate and results in a reactive bed having an extremely long useful life, on the order of upwards of 10 or 20 years. Thus, annual maintainance and operating costs are extremely low. By way of contrast, prior art systems, in which the spent Bauxite from an aluminum process, commonly called red mud and in which ferric chloride is used in the removal of phosphates from waste water, use fine particle sized material, of the order of under 50 mesh. In these prior art systems, the red mud is employed primarily as flocculating agent and is used in conjunction with other active components.

The precipated phosphate compounds from the red mud process, are collected as a sludge which must removed from the system at great cost. Disposal of the red mud can be a costly process fraught with ecological problems. Moreover, it has been commonly held that the lower limit for economically removing phosphates from waste water, is greater than 2 mg of phosphate per liter of water. One of the factors which contributes to the high cost of phosphate removal is the quantity of active material which is required and another is the cost of sludge removal and power requirements for operating the process. A further major cost factor, is the high capital cost involved in accomodating a low reactive rate material. The high dwell time required to acheive a low phosphate level using a red mud system necessitates a large holding tank and thus results in a high capital expense. In direct contrast with the sludge disposal problems of the red mud systems, the spent Bauxite has value in the fertilization of acid soils. The high cost of the Bauxite, as compared to the relatively low cost of the red mud would appear to render the use of Bauxite commercially impractical. Thus, while it would appear that the Bauxite process is not feasible, it has been found that from a long term basis, the Bauxite process provides economic and functional advantages.

TESTS USING SPECIALIZED SUBSTRATES

Test Procedures

Put substrate in three (3) beakers and weigh beakers. Mix tri-sodium phosphate and distilled water in three (3) 1,000 ml volumetric flasks—mix to approximately 20 ppm. Adjust pH using sodium hydroxide and/or sulfuric acid to achieve pH of 6.5, 7.0 and 7.5. Add solutions to the three (3) beakers and have three (3) blanks so that the testing will determine if there is a change in the $PO_4^{-3}$ over time (the volumetric flasks will act as the blank for each test). There will be a total of three (3) tests each base solution or nine (9) tests before adding solution to beakers and 18 tests after adding solution to beakers. Twenty (20) ml samples will be pulled from which three (3) tests will be completed for each beaker.

The solution will be added to the beakers and tested for phosphorus (total P) 24 hours later. Also after 24 hours, the blanks will be tested for phosphorus. It is currently scheduled that the tests will be set up on November 15 and retested on November 16.

Test of Substrate Rate: Test 1:

The substrate material was placed in one (1) 1,400 ml beaker. Mix tri-sodium phosphate and distilled water were added to one 1,000 ml volumetric flask to form an approximately 30 ppm mixture. The pH was adjusted using sodium hydroxide and/or sulfuric acid to achieve a pH of 7.5. The solution was added to the beaker by measuring the amount of liquid added. The volumetric flask acted as the blank for this test. Twenty (20) ml samples were pulled from which one test was completed for each point in time. The purpose of this test was to determine the rate of reaction.

The solution was added to the beaker and tested for phosphorus (total P) at intervals of 10 minutes, 33 minutes, 73 minutes and 217 minutes.

Secondary Effluent Test: Test 2

A sample of secondary effluent from the Fishersville Sewage Treatment Plant was placed in a 1,000 ml volumetric flask. 20 ml samples were used for running one test for total Phosphate. The substrate was placed in one (1) 1,400 ml beaker. Effluent was added to the beaker by measuring the amount of liquid added. The samples were pulled at the same time intervals as were used in Test 1.

| | Total Phosphorus (mg/l) | | |
|---|---|---|---|
| | Reference Solution | | |
| pH | Initial Test | Final Test | 24 Hour |
| 6.5 | 34.4 | 32.7 | <0.1 |
| 7.0 | 34.0 | 33.8 | <0.1 |
| 7.5 | 31.9 | 32.5 | <0.1 |
| Time (minutes) | Total Phosphorus (mg/l) | | |
| | Test 1 | | |
| | Trisodium Phosphate Standard | | |
| 0 | 34.8 | | |
| 10 | 20.3 | | |
| 33 | 12.5 | | |
| 73 | 5.1 | | |
| 217 | 1.4 | | |
| | Test Stream 2 | | |
| 0 | 5.0 | | |
| 10 | 3.2 | | |
| 33 | 1.2 | | |
| 73 | 0.3 | | |

PHASE I—PHOSPHORUS EXPERIMENT

1. Apparatus:
   (a) Mettler balance
   (b) Spectrophotometer
   (c) Hot plate
   (d) Acid-washed glassware
2. Reagents:
   (a) Phenolphthalein indicator
   (b) Sulfuric Acid Solution: Add 300 ml concentrated sulfuric acid to approximately 600 ml distilled water and dilute to one (1) liter with distilled water.
   (c) Potassium Persulfate
   (d) Sodium Hydroxide, 5N.
   (e) Sulfuric Acid, 5N: Dilute 70 ml concentrated sulfuric acid to 500 ml distilled water.
   (f) Potassium antimonyl tartrate solution: Dissolve 1.3715 grams in 400 ml distilled water in a 500 ml volumetric flask and dilute to volume. Store in a glass-stoppered bottle.
   (g) Ammonium Molybdate Solution: Dissolve 20 grams in 500 ml distilled water. Store in a glass stoppered bottle.
   (h) Ascorbic Acid, 0.01M: Dissolve 1.76 grams in 100 ml distilled water. The solution is stable for about one (1) week at 4 C.
   (i) Combined Reagent: Mix the preceding four (4) reagents in the following proportions for 100 ml of the combined reagent:
   50 ml 5N Sulfuric Acid
   5 ml Potassium Antimonyl Tartrate Solution
   15 ml Ammonium Molybdate Solution
   30 ml Ascorbic Acid Solution Mix after addition of each reagent. Mix in the order given. The reagent is stable for four (4) hours.
   (j) Stock Phosphorus Solution: Dissolve 0.2195 grams of Potassium Dihydrogen Phosphate in one (1) liter distilled water. 1.0 ml=0.05 mg P
   (k) Standard Phosphorus Solution: Dilute 100 ml of the stock solution to 1000 ml with distilled water. This is a 0.005 mg/ml solution (5 mg/l).
3. Procedure Commercially available trisodium phosphate (TSP), containing 7.5% elemental phosphorus, was used as the reference solution. Prepare as follows: dissolve 0.03 grams TSP in 1000 ml distilled water. This resulted in an approximately 34 ppm phosphorus solution. The initial pH was 10.6.

In Phase I, three (3) reference solutions were prepared and then adjusted win 1N Sulfuric Acid to obtain pH's of 6.5, 7.0 and 7.5, respectively. Three 1500 ml beakers were filled to the 1400 ml mark with bauxite. The reference solutions were then poured to the 1400 ml mark in the corresponding beaker. This mixture was allowed to "stand" at room temperature for 24 hours.

Samples were then obtained from each of the three beakers by discarding approximately the first 50 ml of solution and then collecting enough sample for the experiment. Phosphorus tests were run on the initial solution as well as on samples from the beakers. A final test was also run on the initial solution to determine if there was any significant variation.

The Persulfate Digestion Method was used as the preliminary digestion step for total phosphorus. For the initial reference solution, one (1) ml of standard was diluted to 50 ml with distilled water. 5, 10, 20 and 50 ml samples, diluted to 50 ml with distilled water if needed, were used for samples from the beakers. All samples were then poured into 125 Erlenmeyer flasks. One drop of phenolphthalein indicator solution, one (1) ml Sulfuric Acid Solution, 0.5 grams Potassium Persulfate, and glass beads were added to each flask.

Flasks were then boiled on a hot plate for approximately 35 minutes until a final volume of approximately ten (10) ml was reached. Samples were cooled and diluted to 30 ml with distilled water. One drop phenolphthalein indicator solution was added and then neutralized to a pink color with 5N Sodium Hydroxide. Sample was then diluted to 100 ml with distilled water and 5N Sulfuric Acid was added dropwise to discharge the color.

Actual phosphorus was determined by the Ascorbic Acid Method. 50 ml of sample was poured into a 50 ml volumetric flask thus leaving 50 ml in the Erlenmeyer flasks. Eight (8) ml of combined reagent was added to the Erlenmeyer flasks and mixed thoroughly by swirling. After 10 minutes, absorbance was measured at 880 nm, using the blank as the reference solution.

Six standards, ranging from 0.1 to 1.0 mg/l, made from Potassium Dihydrogen Phosphate were used to prepare the calibration curve. The blanks was distilled water. All of these were digested like the other samples. Results were plotted on 2 cycle, semi-logarithmic graph paper.

REFERENCE

Standard Methods for the Examination of Water and Wastewater, 1985, 16th ed., APHA, AWWA, WPCF, Method 424C—Persulfate Digestion Method, pg. 444, and 424F, Ascorbic Acid Method, pg. 448-450.

Methods for Chemical Analysis of Water and Wastes, United States Environmental Protection Agency, 1974, Phosphorus, All Forms, pg. 249-263.

PHASE 1—PHOSPHORUS TESTS

| PHASE I - PHOSPHORUS TESTS TRISODIUM PHOSPHATE | | |
|---|---|---|
| Initial Tests | Final Tests | |
| Reference Solution TSP | Reference Solution TSP | Beaker Samples |
| Phosphorus | Phosphorus | Phosphorus |
| pH 6.5 | pH 6.5 | pH 6.5 |
| 33.6 | 31.3 | <0.1 |
| 34.8 avg. 34.4 | 31.9 avg. 32.7 | <0.1 |
| 34.8 | 34.8 | <0.1 |
| pH 7.0 | pH 7.0 | pH 7.0 |
| 33.6 | 31.9 | <0.1 |
| 34.8 avg. 34.0 | 34.8 aVg. 33.8 | <0.1 |
| 36.0 | 34.8 | <0.1 |
| pH 7.5 | pH 7.5 | pH 7.5 |
| 31.9 | 31.3 | <0.1 |
| 31.9 avg 31.9 | 33.6 | <0.1 |

PHASE II—PHOSPHORUS EXPERIMENT

The apparatus and reagents were as disclosed in relation to Phase I.

Procedure

Commercially available trisodium phosphate (TSP), containing 7.5% elemental phosphorus, was used as the reference solution. Prepare as follows: dissolve 0.03 grams TSP in 1000 ml distilled water. This resulted in an approximately 34 ppm phosphorus solution. The initial pH was 10.6.

In Phase II, one (1) reference solution was prepared and then adjusted with 1N Sulfuric Acid to obtain a pH of 7.5. A sample filled to the 1400 ml mark With bauxite. The reference solution and the effluent sample was then poured to the 1400 ml mark in the corresponding beaker. This mixture was allowed to "stand" at room temperature for up to 217 minutes.

Initial tests were run on the reference solution and the effluent. After the solutions were poured into the beakers, samples were obtained at the following intervals: 10 minutes, 33 minutes, 73 minutes, and 217 minutes.

The Persulfate Digestion Method was used as the preliminary digestion step for total phosphorus. For the initial reference solution, one (1) ml of standard was diluted to 50 ml with distilled water. Later dilutions for the reference solution from the beaker included two (2), three (3), five (5) and fifty (50) ml samples, diluted with distilled water if needed. Five (5), twenty (20), and fifty (50) ml samples, diluted to 50 ml with distilled water if needed, were used for the beaker effluent sample. All samples were then poured into 125 Erlenmeyer flasks. One drop of phenolphthalein indicator solution, one (1) ml Sulfuric Acid Solution, 0.5 grams Potassium Persulfate, and glass beads were added to each flask.

Flasks were then boiled on a hot plate for approximately 35 minutes until a final volume of approximately ten (10) ml was reached. Samples were cooled and diluted to 30 ml with distilled water. One drop phenolphthalein indicator solution was added and then neutralized to a pink color with 5N Sodium Hydroxide. Sample was then diluted to 100 ml with distilled water and 5N Sulfuric Acid was added dropwise to discharge the color.

Actual phosphorus was determined by the Ascorbic Acid Method. 50 ml of sample was poured into a 50 ml volumetric flask thus leaving 50 ml in the Erlenmeyer flasks. Eight (8) ml of combined reagent was added to the Erlenmeyer flasks and mixed thoroughly by swirling. After 10 minutes, absorbance was measured at 880 nm, using the blank as the reference solution.

Six standards, ranging from 0.1 to 1.0 mg/l, made from Potassium Dihydrogen Phosphate were used to prepare the calibration curve. The blank was distilled water. All of these were digested like the other samples. Results were plotted on 2 cycle, semi-logarithmic graph paper.

PHASE II—PHOSPHORUS TEST

| PHASE II - PHOSPHORUS TEST (Results in mg/l) | | |
|---|---|---|
| Time | Trisodium PHosphate (TSP) | Effluent |
| 8:43 | 34.8 | 5.0 |
| 8:53 | 20.3 | 3.2 |
| 9:16 | 12.5 | 1.2 |
| 9:56 | 5.4 | 0.3 |
| 12:20 | 1.4 | |

Phosphorus Procedure

Ascorbic Acid/Persulfate Digestion Method

Reagents

Phenolphthalein Indicator: Dissolve 0.5 g of phenolphthalein in a solution of 50 ml of ethyl or isopropyl alcohol and 50 ml of distilled water.

Sulfuric Acid Solution: Carefully add 300 ml concentrated Sulfuric Acid (H2S04) to approximately 600 ml of distilled water and dilute to one liter with distilled water.

Potassium persulfate: K2S2O8

Sodium Hydroxide: (NaOH) 5 Normal, Dissolve 200 grams NaOH in 700 ml distilled water. Cool and dilute to one liter with distilled water.

Sulfuric Acid. H2S04. 5N: Dilute 70 ml concentrated H2S04 to 500 ml with distilled water.

Potassium antimonyl tartrate solution: Dissolve 1.3715 grams K(Sb0)C4H406 1/2H2) in 400 ml distilled water in a 500 ml volumetric flask and dilute to volume. Store in a glass-stoppered bottle.

Ammonium molybdate solution: Dissolve 20 grams (NH4)6Mo7024 4H20 in 500 ml distilled water. Store in a glass-stoppered bottle.

Ascorbic Acid 0.01M: Dissolve 1.76 grams ascorbic acid in 100 ml distilled water. The solution is stable for about one week at 4 C.

Combined Reagent: Mix the above reagents in the following proportions for 100 ml of the combined reagent.

50 ml 5N H2S04

5 ml potassium antimonyl tartrate solution 15 ml ammonium molybdate solution 30 ml ascorbic acid solution Mix after addition of each reagent. Let all reagents reach room temperature before they are mixed and make sure to mix in the order given.

If turbidity forms in the combined reagent, shake and let stand for a few minutes until turbidity disappears before proceeding. The reagent is stable for four (4) hours.

Stock Phosphorus Solution: Dissolve in distilled water 0.2197 grams of potassium dihydrogen phosphate KH2PO4, which has been dried in an oven at 105 C. for one hour. Dilute to 1000 ml. 1.0 ml=0.05 mg P (50 mg/l)

Standard phosphorus solution: Dilute 100 ml of the stock solution to 1000 ml. This is a 0.005 mg/ml solution. (5 mg/l)

Using the standard solution, prepare the following standards in 50 ml volumetric flasks:

| concentration mg/l | ml of standard |
|---|---|
| 0 | 0 |
| 0.1 | 1.0 |
| 0.2 | 2.0 |
| 0.3 | 3.0 |
| 0.4 | 4.0 |
| 0.5 | 5.0 |
| 0.6 | 6.0 |
| 0.7 | 7.0 |
| 0.8 | 8.0 |
| 0.9 | 9.0 |
| 1.0 | 10.0 |

Procedure

1. For the blank, use 50 ml of distilled water and treat as a regular sample.
2. Use a suitable portion of thoroughly mixed 24 hour composite effluent sample (ex. 3, 5, 10 ml) and dilute to 50 ml in a 50 ml volumetric flask.
3. Transfer to 125 ml Erlenmeyer flasks.
4. Add 1 drop phenolphthalein indicator solution. If a red color develops, add H2SO4 dropwise to discharge the red color.
5. Then add 1 ml H2SO4 solution and 0.4 grams ammonium persulfate.
6. Add small stir bar.
7. Boil gently on a preheated hot plate for 30 or 40 minutes or until a final volume of 10 ml is reached. Do not allow sample to go to dryness.
8. Cool and dilute the sample to 30 ml with distilled water. Place flask on magnetic stirrer. Add one drop phenolphthalein indicator solution and neutralize to a fain pink color by add 5N NaOH. Add 20 ml of distilled water.
9. Add 5N H2SO4 dropwise to neutralize pink color to clear.
10. Add 50 ml distilled water to volumetric flasks and then pour into the correct Erlenmeyer flask for a total of 100 mls. Mix.
11. Using the same volumetric flask, take out 50 ml of sample, leaving the other 50 ml in the erlenmeyer flask.
12. With a 8 ml volmetric pipet, add 8 ml combined reagent and mix thoroughly. After a minimum of ten minutes, but no longer than thirty minutes, measure the color absorbance of each sample at 880 nm with a spectrophotometer, using the blank as a reference solution.

Calculation $$\text{mg } P/L = \frac{\text{mg } P \text{ (in approximately 58 ml final volume)} \times 1000}{\text{ml sample}}$$

Absorbance

Absorbance was measured at 880 nm. using the red color filter.

We claim:

1. The method of treating a waste water stream containing phosphate, comprising the steps of wash bauxite, grading the washed bauxite to produce bauxite having a particle size greater than 50 mesh, and contacting the waste water stream with said graded and washed bauxite for a time sufficient to lower the phosphate concentration to less than about 2 mg/l, said step of contacting comprising flowing said wastewater through a bed of said graded and washed bauxite to form a treated wastewater and a phosphate precipitate in said treated wastewater while preventing clogging of said bed by said precipitate, and recovering said treated wastewater and phosphate precipitate as an outflow from the bed and separating the precipitate from the treated wastewater.

2. The method of claim 1, wherein the bauxite and waste water contact occurs in a first treatment region and the effluent from said first treatment region is collected in a second treatment region.

3. The method of claim 1, wherein the bauxite and waste water contact occurs as a result of upward flow of said waste water through a first treatment region and the effluent from said first treatment region is removed from the top of said first treatment and collected in a second treatment region.

4. A method of treating a waste water stream containing phosphate, comprising the step of contacting the waste water stream with bauxite for a time sufficient to lower the phosphate concentration to at least a predetermined maximum concentration, wherein the bauxite has an average particle size greater than 50 mesh, said step of contacting comprising flowing said wastewater through a bed of said bauxite to form a treated wastewater and a phosphate precipitate in said treated wastewater while preventing clogging of said bed, and recovering said treated wastewater and phosphate precipitate as an outflow from the bed and separating the precipitate from the treated wastewater.

5. The method of claim 4, wherein the Bauxite has an average particle size of greater than about one quarter of an inch.

6. The method of claim 4, wherein the bauxite has an average particle size of about one quarter of an inch.

7. The method of claim 4, wherein the bauxite contact is for a sufficient time to lower the phosphate concentration to less than about 2 mg/l.

8. The method of claim 4, wherein the waste water flows downwardly through said bed of bauxite to produce said treated waste water stream having a phosphate concentration less than about 2 mg/l of waste water.

9. The method of claim 8, wherein said treated waste water is collected in a settling tank for a time sufficient for precipitated particles to settle out.

* * * * *